(12) United States Patent
Lauter et al.

(10) Patent No.: US 7,469,048 B2
(45) Date of Patent: Dec. 23, 2008

(54) METHODS FOR POINT COMPRESSION FOR JACOBIANS OF HYPERELLIPTIC CURVES

(75) Inventors: Kristin E. Lauter, La Jolla, CA (US); Peter L. Montgomery, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 171 days.

(21) Appl. No.: 11/277,604

(22) Filed: Mar. 27, 2006

(65) Prior Publication Data

US 2006/0177062 A1   Aug. 10, 2006

Related U.S. Application Data

(63) Continuation of application No. 10/285,198, filed on Oct. 31, 2002, now Pat. No. 7,043,015.

(51) Int. Cl.
*H04L 9/28* (2006.01)
*H04L 9/00* (2006.01)
*H04K 1/00* (2006.01)

(52) U.S. Cl. .......................................... 380/28; 708/203
(58) Field of Classification Search .................... 380/28
See application file for complete search history.

(56) References Cited

U.S. PATENT DOCUMENTS

| 6,163,841 | A | 12/2000 | Venkatesan et al. |
| 6,209,093 | B1 | 3/2001 | Venkatesan et al. |
| 6,845,395 | B1 | 1/2005 | Blumenau et al. |
| 2002/0018560 | A1* | 2/2002 | Lauter et al. .................. 380/28 |
| 2004/0001590 | A1 | 1/2004 | Eisentraeger et al. |
| 2004/0005054 | A1 | 1/2004 | Montgomery et al. |
| 2005/0025311 | A1 | 2/2005 | Eisentraeger et al. |

OTHER PUBLICATIONS

Encinas et al., "Isomorphism Classes of Genus-2 Hyperelliptic Curves Over Finite Fields" Application Algebra in Engineering, Communication and Computing, vol. 13 Issue 1 (2002).
Hess, Florian et al., "Two Topics in Hyperelliptic Crytopgraphy", pp. 181-189 of Selected Areas in Cryptography, 2001, Serge Candenay and Amr M. Youssef (Eds.), LNCS 2249, Springer-Verlag, 2001.
Koblitz, Neal; Algebraic Aspects of Cryptography, 1998, Springer-Verlag Berline Heidelberg, vol. 3, Chapter 6 and appendex.
Lange, Tanja "Efficient Arithmetic on Genus 2 Hyperelliptic Curves over Finite Fields via Explicit Formulae" University of Bochum, Germany Dec. 15, 20003. [http://eprint.iacr.org/2002/121.pdf.
Menezes, Alfred "Elliptic Curve Public Key Cryptosystems" 1993. Kluwer Academic Publishers. pp. 8, 116.

(Continued)

*Primary Examiner*—Emmanuel L. Moise
*Assistant Examiner*—Tamara Teslovich
(74) *Attorney, Agent, or Firm*—Lee & Hayes, PLLC

(57) ABSTRACT

A cryptosystem based on a Jacobian of a hyperelliptic curve is being used. Various methods and apparati are provided for generating a compressed data format that identifies one or more points—on the Jacobian of the hyperelliptic curve, and for subsequently decompressing the compressed format data.

19 Claims, 6 Drawing Sheets

OTHER PUBLICATIONS

Rosing, Michael "Implementing Elliptic Curve Cryptography" 1999. Manning Publications Co. pp. 171-174, 297-300.

Schneier, Bruce, Applied Cryptography, 1996, John Wiley & Sons, 2nd Edition, Chapter 18.

Stahlke, Colin "Point Compression on Jacobians of Hyperelliptic Curves over Fp" 2004. [http://eprint.iacr.org/2004/030.pdf].

Weisstein et al., "Hyperelliptic Curve" From MathWorld—A Wolfram Web Resource. Available at http://mathworld.wolfram.com/HyperellipticCurve.html.

* cited by examiner

METHODS FOR POINT COMPRESSION FOR JACOBIANS OF HYPERELLIPTIC CURVES

RELATED APPLICATIONS

This application is a continuation of U.S. patent application Ser. No. 10/285,198, filed Oct. 31, 2002, which is hereby incorporated by reference herein.

TECHNICAL FIELD

This invention relates to cryptography, and more particularly to methods and apparati for providing point compression for Jacobians of hyperelliptic curves.

BACKGROUND

As computers have become increasingly commonplace in homes and businesses throughout the world, and such computers have become increasingly interconnected via networks (such as the Internet), security and authentication concerns have become increasingly important. One manner in which these concerns have been addressed is the use of a cryptographic technique involving a key-based cipher. Using a key-based cipher, sequences of intelligible data (typically referred to as plaintext) that collectively form a message are mathematically transformed, through an enciphering process, into seemingly unintelligible data (typically referred to as ciphertext). The enciphering can be reversed, allowing recipients of the ciphertext with the appropriate key to transform the ciphertext back to plaintext, while making it very difficult, if not nearly impossible, for those without the appropriate key to recover the plaintext.

Public-key cryptographic techniques are one type of key-based cipher. In public-key cryptography, each communicating party has a public/private key pair. The public key of each pair is made publicly available (or at least available to others who are intended to send encrypted communications), but the private key is kept secret. In order to communicate a plaintext message using encryption to a receiving party, an originating party encrypts the plaintext message into a ciphertext message using the public key of the receiving party and communicates the ciphertext message to the receiving party. Upon receipt of the ciphertext message, the receiving party decrypts the message using its secret private key, and thereby recovers the original plaintext message.

The RSA (Rivest-Shamir-Adleman) method is one well-known example of public/private key cryptology. To implement RSA, one generates two large prime numbers p and q and multiplies them together to get a large composite number N, which is made public. If the primes are properly chosen and large enough, it will be practically impossible (i.e., computationally infeasible) for someone who does not know p and q to determine them from knowing only N. However, in order to be secure, the size of N typically needs to be more than 1,000 bits. In some situations, such a large size makes the numbers too long to be practically useful.

One such situation is found in authentication, which can be required anywhere a party or a machine must prove that it is authorized to access or use a product or service. An example of such a situation is in a product ID system for a software program(s), where a user must hand-enter a product ID sequence stamped on the outside of the properly licensed software package as proof that the software has been properly paid for. If the product ID sequence is too long, then it will be cumbersome and user unfriendly.

Additionally, not only do software manufacturers lose revenue from unauthorized copies of their products, but software manufacturers also frequently provide customer support, of one form or another, for their products. In an effort to limit such support to their licensees, customer support staffs often require a user to first provide the product ID associated with his or her copy of the product for which support is sought as a condition for receiving support. Many current methods of generating product IDs, however, have been easily discerned by unauthorized users, allowing product IDs to be generated by unauthorized users.

Given the apparent ease with which unauthorized users can obtain valid indicia, software manufacturers are experiencing considerable difficulty in discriminating between licensees and such unauthorized users in order to provide support to the former while denying it to the latter. As a result, manufacturers often unwittingly provide support to unauthorized users, thus incurring additional and unnecessary support costs. If the number of unauthorized users of a software product is sufficiently large, then these excess costs associated with that product can be quite significant.

New curve-based cryptography techniques have recently been employed to allow software manufacturers to appreciably reduce the incidence of unauthorized copying of software products. For example, product IDs have been generated using elliptic curve cryptography techniques. The resulting product IDs provide improved security. Moreover, such IDs can be configured such that the user is not required to input too many characters. So far, the curve-based techniques have been based on curves with genus greater than or equal to two.

It would be beneficial to be able to utilize higher genus curves, e.g., hyperelliptic curves with genus greater than or equal to two. Doing so will likely further improve security. Moreover, it would be beneficial for the resulting information (data) to have a size that is suitable for use as a short signature, product ID, and/or the like. Consequently, for this and other reasons there is a need for methods and apparati that provide for compression of the resulting information. In curve-based cryptosystems, for example, compressing the point information can significantly reduce the amount of data within the resulting compressed format.

SUMMARY

In accordance with certain exemplary aspects of the present invention, various methods and apparati are provided for generating a compressed format data that identifies one or more points on the Jacobian of the hyperelliptic curve, and for subsequently decompressing the compressed format data.

By way of example, the above-stated needs and others are satisfied, for example, by a method for compressing curve-based cryptography information using a computing device in accordance with certain exemplary implementations of the present invention. The method includes establishing point information suitable for identifying at least one point on a Jacobian of a hyperelliptic curve, and representing a portion of the point information in a compressed format such that the point information can subsequently be regenerated and the selected points determined based on the regenerated point information.

In accordance within certain other exemplary implementations of the present invention, a computer-readable medium having computer-executable instructions for performing acts, such as, compressing curve-based cryptography information is provided. Here, the acts include determining point information suitable for identifying at least one selected point on a Jacobian of a hyperelliptic curve, and outputting a portion of the point information within a compressed format.

In accordance with still other implementations of the present invention, a method is provided, which includes receiving compressed format information, identifying polynomial factors in the received compressed format information, determining a sign for each factor, generating a first polynomial based on the factors, and generating a second polynomial based on the factors and the sign of each factor. Here, for example, the first and second polynomials define at least one point on a Jacobian of a hyperelliptic curve of genus equal to g, where g is greater than two.

The above stated needs and others are also met by an apparatus suitable for compressing curve-based cryptography information. The apparatus includes logic that is operatively configured to determine point information. The point information identifies at least one selected point on a Jacobian of a hyperelliptic curve. The logic outputs at least a portion of the point information in a compressed format from which the point information can subsequently be regenerated and the selected points determined based on the regenerated point information.

In accordance with still other implementations of the present invention, an apparatus is provided which includes logic that is operatively configurable to receive compressed format information, identify factors in the received compressed format information, determine a sign for each factor, generate a first polynomial based on the factors, and generate a second polynomial based on the factors and the sign of each factor. Here, for example, the first and second polynomials define at least one point on a Jacobian of a hyperelliptic curve of genus equal to g, where g is greater than or equal to two.

BRIEF DESCRIPTION OF THE DRAWINGS

The present invention is illustrated by way of example and not limitation in the figures of the accompanying drawings. The same numbers are used throughout the figures to reference like components and/or features.

DETAILED DESCRIPTION

The discussions herein assume a basic understanding of cryptography by the reader. For a basic introduction of cryptography, the reader is directed to a book written by Bruce Schneier and entitled "Applied Cryptography: Protocols, Algorithms, and Source Code in C," published by John Wiley & Sons with copyright 1994 (or second edition with copyright 1996).

Described herein are point compression techniques that can be used with a curve-based cryptosystem. In certain examples the point compression techniques are applied to divisors of Jacobians of curves.

Typically, the curve-based cryptosystem is based on a group whose size is known to the cryptosystem designer but unknown and believed difficult to determine for attackers of the cryptosystem. The curve-based encryption and decryption illustrated as an example herein refers to encryption and decryption that uses keys that are generated based on aspects or characteristics of a mathematical hyperelliptic curve. This exemplary cryptosystem is based on the Jacobian of the hyperelliptic curve being used, and the secret group size is the size of the group of points on the Jacobian of the curve.

Such curve-based cryptosystems can be used to encrypt any of a wide variety of information. Here, for example, the cryptosystem is described primarily with respect to generation of a "short" signature or product identifier, which is a code that allows validation and/or authentication of a machine, program, user, etc. The signature is a "short" signature in that it uses a relatively small number of characters. The signature is shortened by the various point compression techniques provided herein.

Figure 1:
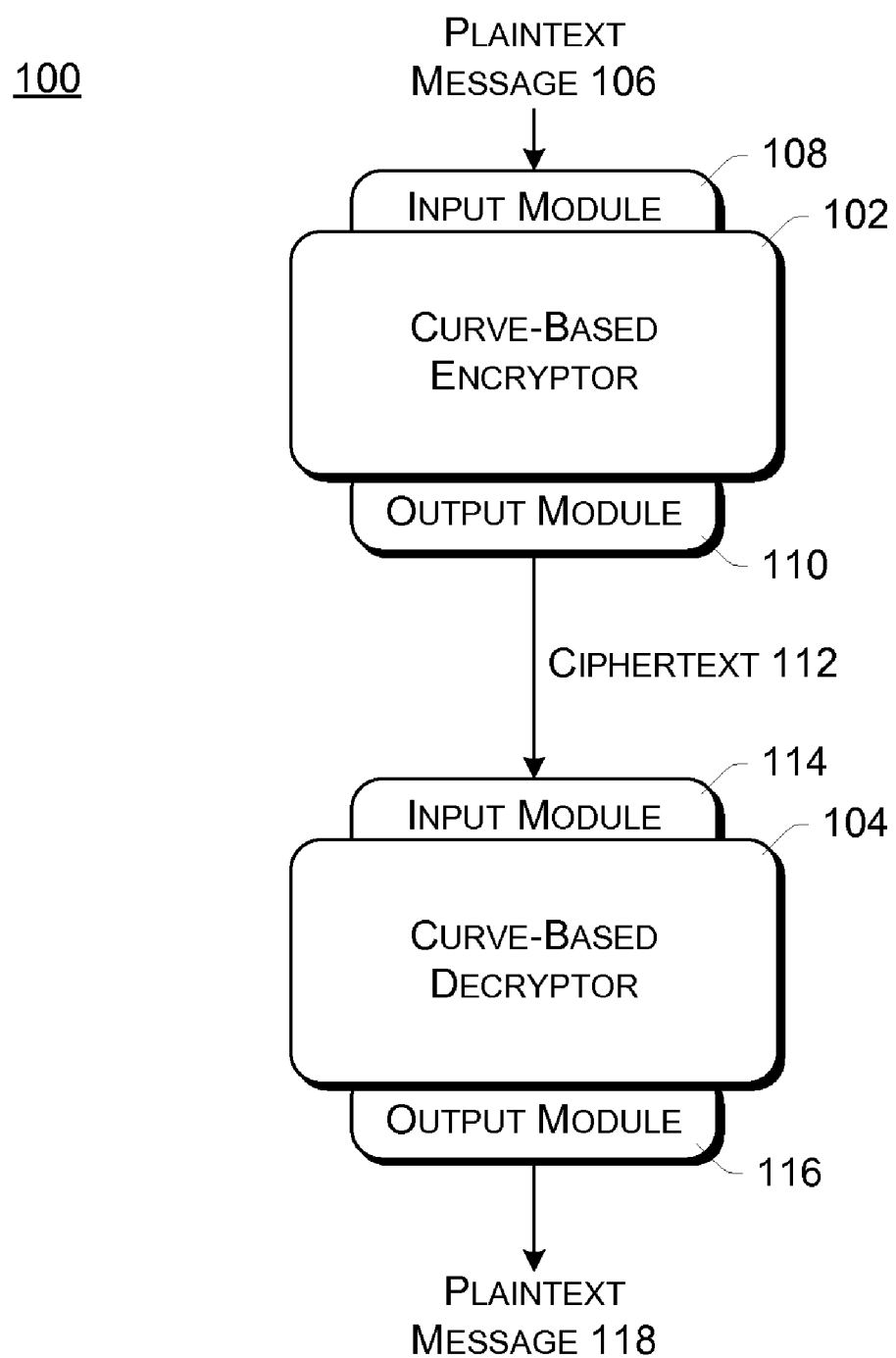
FIG. 1 is a block diagram illustrating an exemplary cryptosystem in accordance with certain implementations of the present invention.

With this in mind, attention is drawn to FIG. 1, which is a block diagram illustrating an exemplary cryptosystem 100 in accordance with certain implementations of the present invention. Cryptosystem 100 includes an encryptor 102 and a decryptor 104. A plaintext message 106 is received at an input module 108 of encryptor 102, which is a curve-based encryptor that encrypts message 106 based on a public key generated based on a secret group size (known only by decryptor 104). This secret group size is the size of the group of points on the Jacobian of the curve being used, and is discussed in more detail below. Plaintext message 106 is typically an unencrypted message, although encryptor 102 can encrypt any type of message. Thus, message 106 may alternatively be encrypted or encoded by some other component (not shown) or a user. Message 106 may need to be converted to a divisor before encryption and un-converted after decryption (not shown).

An output module 110 of encryptor 102 outputs the encrypted version of plaintext message 106, which is ciphertext 112. Ciphertext 112 can then be communicated to decryptor 104, which can be implemented, for example, on a computer system remote from a computer system on which encryptor 102 is implemented. Given the encrypted nature of ciphertext 112, the communication link between encryptor 102 and 104 need not be secure (it is typically presumed that the communication link is not secure). The communication link can be any of a wide variety of public and/or private networks implemented using any of a wide variety of conventional public and/or proprietary protocols, and including both wired and wireless implementations. Additionally, the communication link may include other non-computer network components, such as hand-delivery of media including ciphertext or other components of a product distribution chain.

Decryptor 104 receives ciphertext 112 at input module 114 and, being aware of the secret group size used to encrypt message 106 (as well as the necessary exponent), is able to readily decrypt ciphertext 112 to recover the original plaintext message 106, which is output by output module 116 as plaintext message 118. Decryptor 104 is a curve-based decryptor that decrypts the message based on the size of the group of points on the Jacobian of the curve (the same value as was used by encryptor 102), and is discussed in more detail below.

Encryption and decryption are performed in cryptosystem 100 based on a secret, which is the size of the group of points on the Jacobian of a hyperelliptic curve. In accordance with certain aspects of the present invention, the hyperelliptic curve can have a genus greater than or equal to two. However, in certain implementations, the curve may be an elliptic curve (e.g., a hyperelliptic curve having genus equal to one).

This secret is known to decryptor 104, and a public key generated based on the secret is known to encryptor 102. This knowledge allows encryptor 102 to encrypt a plaintext message that can be decrypted only by decryptor 104. Other components, including encryptor 102, which do not have knowledge of the secret cannot decrypt the ciphertext (although decryption may be technically possible, it is not computationally feasible). Similarly, decryptor 104 can also generate a message using the secret and based on a plaintext message, a process referred to as digitally signing the plaintext message. This signed message can then be communicated to other components, such as encryptor 102, which can in turn verify the digital signature based on the public key.

Figure 2:
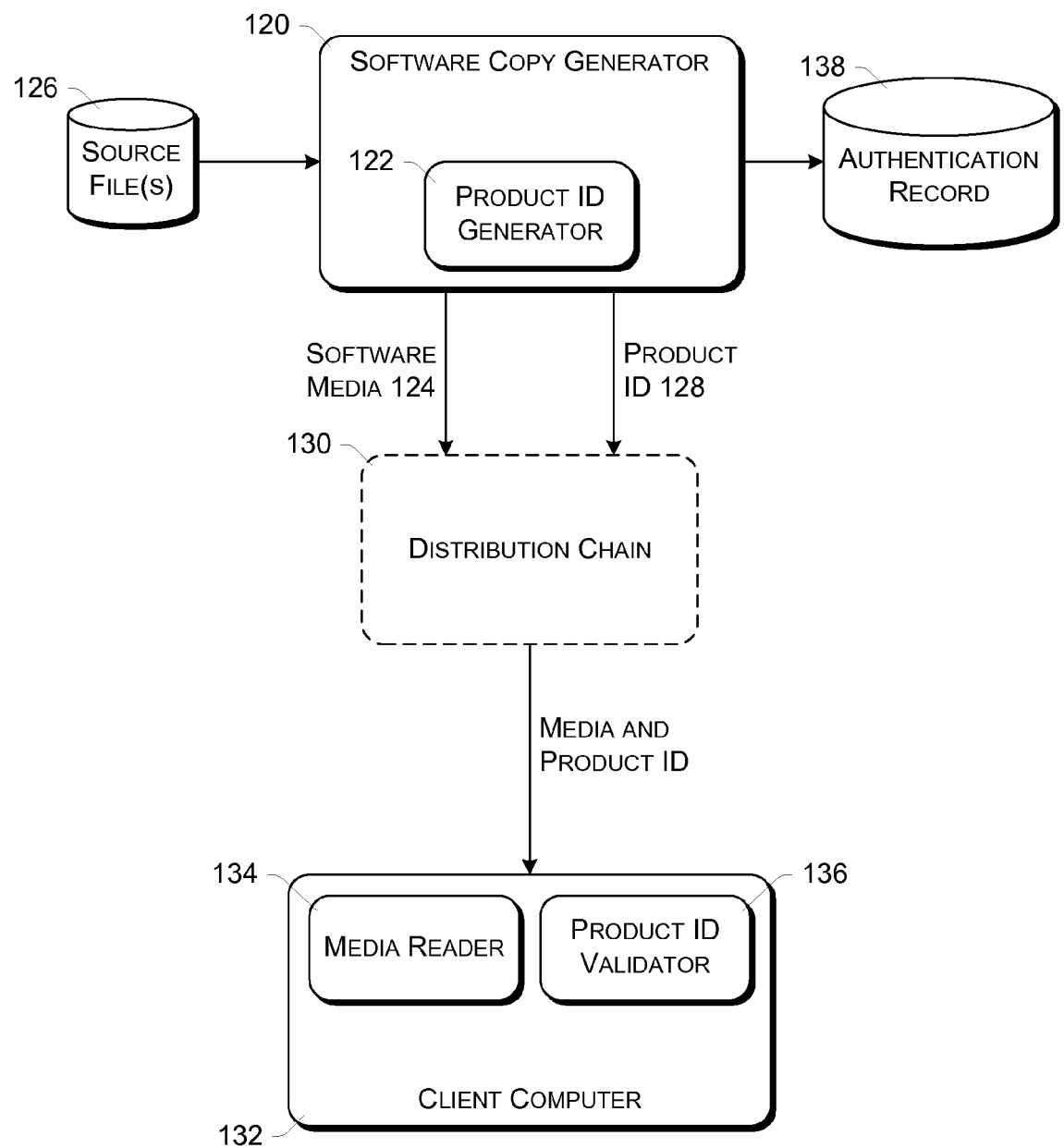
FIG. 2 illustrates an exemplary system using a product identifier to validate software in accordance with certain implementations of the present invention.

FIG. 2 illustrates an exemplary system using a product identifier to validate software in accordance with certain implementations of the present invention. FIG. 2 illustrates a software copy generator 120 including a product identifier (ID) generator 122. Software copy generator 120 produces software media 124 (e.g., a CD-ROM, DVD (Digital Versatile Disk), etc.) that contains typically all the files needed to collectively implement a complete copy of one or more application programs, (e.g., a word processing program, a spreadsheet program, an operating system, a suite of programs, and so forth). These files are received from source files 126, which may be a local source (e.g., a hard drive internal to generator 120), a remote source (e.g., coupled to generator 120 via a network), or a combination thereof. Although only a single generator 120 is illustrated in FIG. 2, typically multiple such generators operate individually and/or cooperatively to increase the rate at which software media 124 can be generated.

Product ID generator 122 generates a product ID 128 that can include numbers, letters, and/or other symbols. Generator 122 generates product ID 128 using the curve-based encryption process described herein. The product ID 128 is typically printed on a label and affixed to either a carrier containing software media 124 or a box into which software media 124 is placed. Alternatively, the product ID 128 may be made available electronically, such as a certificate provided to a user when receiving a softcopy of the application program via an on-line source (e.g., downloading of the software via the Internet). The product ID can serve multiple functions. First, the product ID can be cryptographically validated in order to verify that the product ID is a valid product ID (and thus allowing, for example, the application program to be installed). Additionally, the product ID can optionally serve to authenticate the particular software media 124 to which it is associated.

The generated software media 124 and associated product ID 128 are then provided to a distribution chain 130. Distribution chain 130 represents any of a variety of conventional distribution systems and methods, including possibly one or more "middlemen" (e.g., wholesalers, suppliers, distributors, retail stores (either on-line or brick and mortar), etc.). Regardless of the manner in which media 124 and the associated product ID 128 are distributed, eventually media 124 and product ID 128 are purchased (e.g., licensed), by the user of a client computer 132.

Client computer 132 includes a media reader 134 capable of reading software media 124 and installing the application program onto client computer 132 (e.g., installing the application program on to a hard disk drive (not shown) of client computer 132). Part of this installation process involves entry of the product ID 128. This entry may be a manual entry (e.g., the user typing in the product ID via a keyboard), or alternatively an automatic entry (e.g., computer 132 automatically accessing a particular field of a license associated with the application program and extracting the product ID therefrom). Client computer 132 also includes a product ID validator 136 which validates, during installation of the application program, the product ID 128. This validation is performed using the curve-based decryption techniques, for example, as described herein.

If validator 136 determines that the product ID is valid, then an appropriate course of action is taken (e.g., an installation program on software media 124 allows the application to be installed on computer 132). However, if validator 136 determines that the product ID is invalid, then a different course of action is taken (e.g., the installation program terminates the installation process preventing the application program from being installed).

Product ID validator 136 also optionally authenticates the application program based on the product ID 128. This authentication verifies that the product ID 128 entered at computer 132 corresponds to the particular copy of the application be accessed. The authentication can be performed at different times, such as during installation, or when requesting product support or an upgrade. Alternatively, this authentication may be performed at a remote location (e.g., at a call center when the user of client computer 132 calls for technical support, the user may be required to provide the product ID 128 before receiving assistance).

If the application program manufacturer desires to utilize the authentication capabilities of the product ID, then the product ID generated by generator 122 for each copy of an application program is unique. This uniqueness is created by assigning a different initial number or value to each copy of the application program. This initial value can then be used as a basis for generating the product ID.

The unique value associated with the copy of the application program can be optionally maintained by the manufacturer as an authentication record 138 (e.g., a database or list) along with an indication of the particular copy of the application program. This indication can be, for example, a serial number embedded in the application program or on software media 124, and may be hidden in any of a wide variety of conventional manners.

Alternatively, the individual number itself may be a serial number that is associated with the particular copy, thereby allowing the manufacturer to verify the authenticity of an application program by extracting the initial value from the product ID and verifying that it is the same as the serial number embedded in the application program or software media 124.

Appropriate action can be taken based on whether the product ID is authenticated. These actions can vary, depending on the manufacturer's desires and/or action being taken at computer 132 that caused the authentication check to occur. For example, if a user is attempting to install an application program then installation of the program may be allowed only if the authentication succeeds. By way of another example, the manufacturer's support technicians may provide assistance to a user of computer 132 only if the authentication succeeds, or an upgrade version of the application program may be installed only if authentication of the previous version of the application program succeeds.

Figure 3:
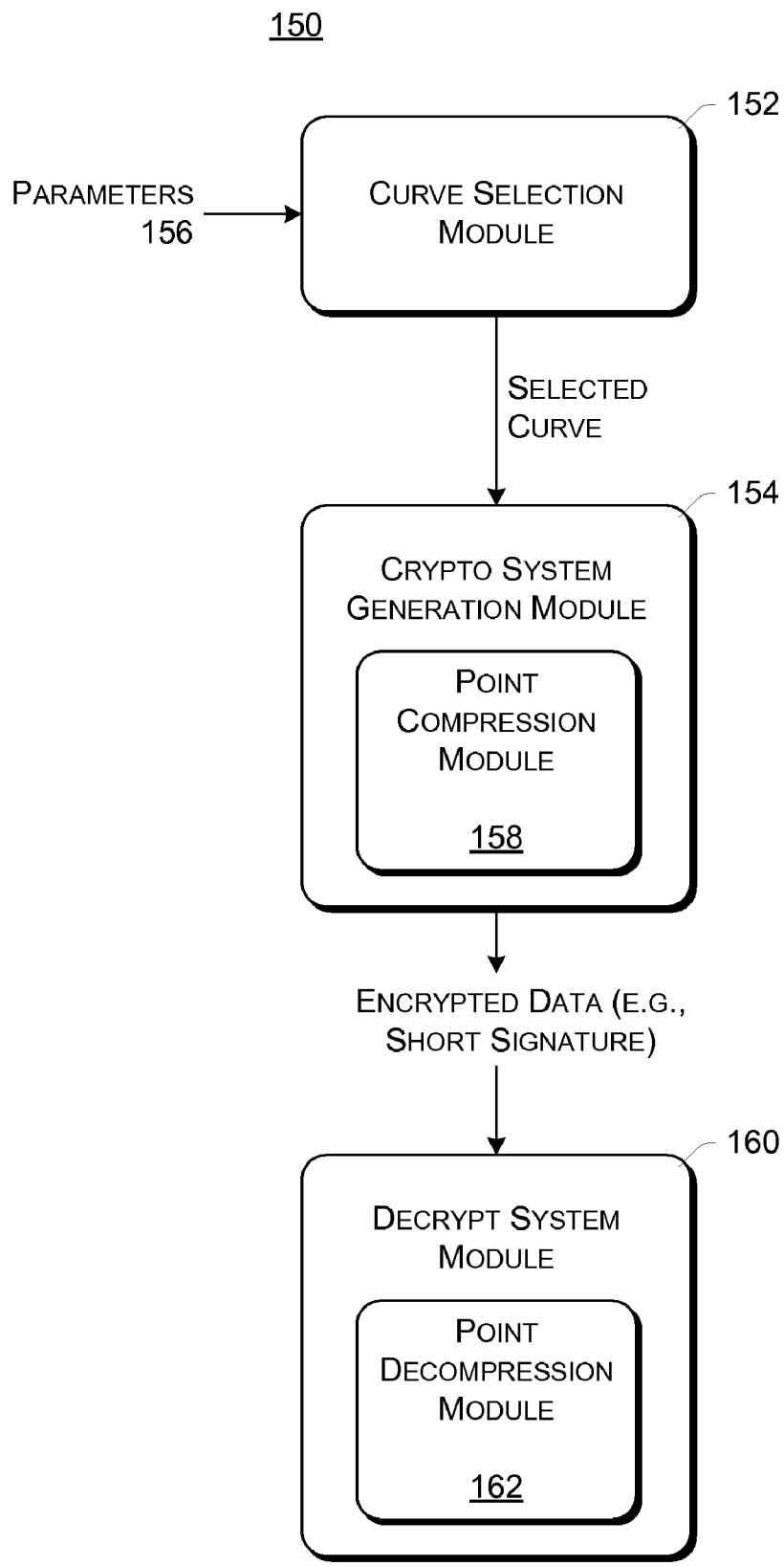
FIG. 3 illustrates an exemplary cryptographic system generator in accordance with certain implementations of the present invention.

FIG. 3 illustrates an exemplary cryptographic system generator in accordance with certain implementations of the invention. The generator system 150 generates a cryptosystem based on a secret that is the size of a group of points on the Jacobian of a hyperelliptic curve. The cryptosystem generated by system 150 can be used, for example, to implement the system 100 in FIG. 1 or the product ID based system of FIG. 2. The system 150 includes a curve selection module 152 and a cryptographic system generation module 154. Curve selection module 152 receives a set of one or more parameters 156 as inputs and selects a curve to be used based on the parameters 156. In one implementation, parameters 156 include an indication of the genus of the curve and a size (e.g., in bits) that the product identifier should be. Curve selection module 152 can then select a hyperelliptic curve based on these parameters in any of a variety of well-known manners. Curve selection module 152 then provides the selected hyperelliptic curve to cryptographic system generation module 154. Cryptographic system generation module 154 generates the cryptographic system, determining the group and the size of the group (which is the secret that is being maintained). A point compression module 158 is provided to reduce the length of the resulting short signature. Here, point compression module 158 is illustrated as being part of crypto system generation module 154. In other implementations, point compression module 158 may be a separate module.

For illustration purposes, a decrypt system module 160 is also depicted as receiving the short signature as input and performing the counter part to crypto system generation module 154. A point decompression module 162 is shown as supporting decrypt system module 160 and performing the counterpart to point compression module 158.

The following description focuses on certain exemplary techniques that can be implemented within one or more of the modules in system 150. Curve selection module 152 can be configured to select a hyperelliptic curve given by the equation $y^2=f(x)$, referred to herein as the equation C, over a finite field $F_p$, where p is a prime number and where f is a polynomial of degree $2 \cdot g+1$ and g is the genus of the hyperelliptic curve. Given this selected curve, cryptographic system generation module 154 determines the Jacobian J(C) over the finite field $F_p$ for the curve. The group of points on the Jacobian J(C) is denoted by $J(C)(F_p)$, and the order of $J(C)(F_p)$, also referred to as the size of $J(C)(F_p)$ or the number of elements in $J(C)(F_p)$, is secret. The order of $J(C)(F_p)$ can be selected by the cryptosystem designer and made available to cryptographic system generation module 154 (e.g., as one of parameters 156, or alternatively separately). An element of the group J(C) is called a divisor on the curve, and it is given as a pair of polynomials a(x) and b(x).

For example, let q be an odd prime or prime power and $F_q$ denote the finite field of q elements. If g is a positive integer, for example, then a hyperelliptic curve can be given as an equation $y^2=f(x)$ over $F_q$, where the degree of f(x) is $2g+1$ or $2g+2$ and f(x) has no repeated factors. Then g is called the genus of the curve. Assume for simplicity that the degree of f(x) is $2g+1$ for the remainder of this exposition. Elements of the Jacobian of the curve are degree-zero divisors, and can be represented by two polynomials a(x), b(x) in $F_q[x]$ such that:

(1) degree(b)<degree(a)≦g and
(2) a(x) divides $f(x)-b(x)^2$.

One exemplary goal of point compression is to reduce the amount of information (data) that needs to be stored/sent/input to identify a(x) and b(x) uniquely. Often, for example, degree(a)=g and degree(b)=g−1. Since a has g+1 coefficients and b has g coefficients, a straightforward approach would use 2g+1 field elements. One can save one field element by making a(x) monic, since a(x) is only needed modulo a scalar factor. As such, $\log_2(q)$ bits are needed to represent a field element.

Condition (2) above, imposes g algebraic equations on the other 2g coefficients. However, in many situations it would be desirable to only deal with g coefficients. This tends to be optimistic, since the group may have (slightly) over $q^g$ elements. For example, certain compression techniques provided herein may use g field elements and one or more extra bits.

For ease of understanding, an element of the Jacobian of a curve can be thought of as a multiset with at most g points on the curve, where g is the genus of the curve. These points on the curve can lie in an algebraic extension of the finite field, and the multiset never includes both a point and its negative.

The generation of the Jacobian of a curve, as well as performing operations in the Jacobian, are well-known to those skilled in the art. However, for additional information on Jacobians, the reader is directed to David Mumford, *Tata Lectures on Theta*, Volume 2 (Birkhauser 1984), and David Cantor, *Mathematics of Computation* (an American Mathematical Society journal), Volume 48, number 177, January 1987, pp. 95-101.

Knowing how to perform group operations on the Jacobian, an element P of the Jacobian can be raised to a publicly available exponent e (that is, $P^e$), with this result $P^e$ also being on the Jacobian. The value $P^e$ can then be transmitted over a non-secure communication link (or stored in a non-secure manner), and the privacy of the value P maintained because an attacker cannot readily recover P without knowing the secret group size (the order of $J(C)(F_p)$). If the group size is known, however, then a value d can be readily determined so that the value $P^e$ can be raised to the value d (that is, $(P^e)^d$), which recovers the value of P. It is very difficult (computationally infeasible) to recover the value of P based on the value $P^e$ without knowing the secret group size.

The value of e can be any value, but larger prime values typically provide greater security. The value of d can be readily determined by solving for d such that $e \cdot d=1$ mod |G|, where |G| refers to the secret group size (that is, to the order of $J(C)(F_p)$).

A point P on the Jacobian can be digitally signed in an analogous manner. The point P is raised to the secret exponent d (that is, $P^d$). The value $P^d$ can then be communicated or otherwise made available to another device that knows the publicly available exponent e. The value of P can then be recovered by raising the value $P^d$ to the value e (that is, $(P^d)^e$). However, without knowing the secret group size, a false value $P^d$ that resulted in a valid value of P could not be created by an attacker because the attacker could not generate the value d.

Described below are several exemplary point compression/decompression techniques that can be implemented to reduce the amount of data that is associated with the short signatures, etc., as generated by curve-based cryptosystems. Many of these techniques only require a few extra bits (e.g., 2g extra bits).

A first scheme includes using (i.e., storing, sending, inputting, etc.) all of b(x) and 2g extra bits. Knowing b(x), where degree(b)<g, it computes the polynomial $c(x)=f(x)-b(x)^2$. We know a(x) divides c(x) and must specify a(x) uniquely. The first scheme factors c(x) over $F_q$ (or an algebraic extension thereof), and arranges the resulting (possibly repeated) factors in a canonical order. There are at most degree(c(x)) =degree(f(x))=2g+1 non-constant factors to enumerate. With 2g+1 bits, one can identify which factors of c(x) to include in a(x) and which to omit. To save a bit, observe that only one of a(x) and c(x)/a(x) has degree g or less. One drawback to this first scheme is that whenever data is written or read, one may be required to factor a polynomial of degree 2g+1.

A second scheme saves a(x) and solves $b(x)^2 \equiv f(x)$ mod a(x) for b(x). This scheme factors a(x) over $_{Fq}$. The resulting factors (which may have exponents) are arranged in a canonical order. For each of the (up to g) factors of a(x), a bit identifies which square root to use for b(x) modulo (factor of a(x)). The Chinese Remainder Theorem is then applied to determine b(x) mod a(x).

Thus, for example, in the second scheme, if $a_i(x)$ is an irreducible factor of a(x) over $_{Fq}$, then standard techniques let one find $b_i(x)$ such that $b_i(x)^2 \equiv f(x) \pmod{a_i(x)}$, when such $b_i(x)$ exists. When $b_i(x)$ is not the zero polynomial, there will be one other square root of f(x) modulo $a_i(x)$, namely $-b_i(x)$ (recall q is odd). Consequently, one can then partition the potential square roots (i.e., all polynomials modulo $a_i(x)$) into two halves, one called positive and the other called negative, such that $b_i(x)$ and $-b_i(x)$ are in opposite halves unless $b_i(x)$ =0. There are many other ways to define such a partition, for example, one might compare the binary representations of $b_i(x)$ and $-b_i(x)$. Nevertheless, the encrypting party/device and decrypting party/device will need to agree on the partition that is used. As used herein, the term sign identifies which set (within the partition) a particular polynomial belongs to.

When a(x) has a repeated factor $a_i(x)^e$ (e>1) and $a_i(x)$ does not divide f(x), then one can compute a unique (up to sign) square root $b_i(x)$ of f(x) modulo $a_i(x)^e$ given a square root modulo $a_i(x)$. This is an instance of Hensel lifting. Note that since f is assumed to have no repeated factor, if $a_i(x)$ divides f(x) then $a_i(x)^e$ does not divide f(x) when e>1.

For each irreducible factor (or power thereof) $a_i(x)$ of a(x), one will know which square root $\pm b_i(x) \pmod{a_i(x)}$ to use. The Chinese Remainder Theorem can then be applied to reconstruct the unique b(x) satisfying $b(x) \equiv b_i(x)$ (modulo $a_i(x)$) for all i.

As such, the second scheme will usually require one to factor a(x) whenever data is written or read. Compared to the first scheme, the number of extra bits required has been reduced from 2g+1 bits to g bits.

In accordance with certain other exemplary implementations, a third scheme is provided in which a(x) is provided in factored form. The "sign" of b(x) modulo each factor of a(x) is then determined. During encryption (compression), the factors of a(x) may then be rearranged to infer their signs, and/or additional flag bit(s) may be introduced to impart that certain factors have certain/different signs. By way of example, the "positive" factor(s) can be arranged/grouped at the beginning of a compressed format followed by the "negative" factor(s), with at least one transitional flag bit introduced in between to delineate the two groupings. Of course, the opposite ordering of these groupings may also be implemented such that negative factor(s) precede the transition bit(s) and positive factor(s). If, in this example, all of the factors have the same "sign" then the compressed format may begin with a transition bit(s), if applicable. If when factoring a(x) it is found that a(x) is irreducible, then this too can be indicated by the ordering of the compressed format and/or applicable flag bit(s).

This third scheme is illustrated here with several examples. By way of example, $$a(x)=(x^3+c_0x^2+c_1x+c_2)(x+c_3)(x^2+c_4x+c_5)$$

when a has degree 6 and splits into factors of degrees 3, 1, 2. The six coefficients $c_0$ to $c_5$ are saved. Then, for each coefficient, a trit is generated, which will have one of the following values:

0—Representing that there are more coefficients in given factor (e.g., applies to $c_0$, $c_1$, $c_4$ above).

1—Representing that this is the last coefficient of a factor and to use the positive square root for b(x).

2—Representing that this is the last coefficient of a factor and to use the negative square root for b(x).

Note that if degree(a(x))<g, then one can insert zeros into the last g−degree(a) trits.

This is but one example as to how one might generate a compressed format for the divisors. Unlike the first two schemes above, this third scheme eliminates the potential need for the decrypting device to factor a polynomial. The decrypting device may nonetheless need to reduce f(x) modulo each factor $a_i(x)$ of a(x) and determine a $b_i(x)$ for this factor. In other implementations, additional encoding can be used to represent repeated polynomial factors of a(x).

The following is exemplary pseudo code for a compression algorithm in accord with this third scheme for a genus two curve-based cryptosystem. The constant r is a quadratic non-residue modulo q. The same non-residue will be used by the encrypting device and the decrypting device. The two parties must also agree on an ordering of the elements of $_{Fq}$, for the<operator.

Divisor compression:

The output is two integers in [0, q] and a value from {0, 1, 2}. There are at most $3(q+1)^2$ possible outputs in this example. About ⅓ of this potential output space is used, meaning the technique is a factor of $\log_2 3 \approx 1.58$ bits from the theoretical minimum.

```
To compress (a(x), b(x)) where degree(b) < degree(a) ≤ 2
    if a(x) = 1 (constant) then
        output trit (q, q, *) //where * is anything//
    else if a(x) = x + c (linear) then
        output trit (c, q, b₁) where b₁ = 0 or 1 identifies sign of b(x)
    else if a(x) = (x + c)² then
        output trit (q, c, b₁) where b₁ = 0 or 1 identifies sign of b(x)
    else if a(x) factors as (x + f₁)*(x + f₂) with f₁ < f₂ then
        Choose b₁ = 0 or 1 to identify sign of b(x) mod x + f₁
        Choose b₂ = 0 or 1 to identify sign of b(x) mod x + f₂
        if (b₁ = b₂) then
            output trit (f₁, f₂, b₁)
        else
            output trit (f₂, f₁, b₁)
        end if
    else if (a(x) factors as (x + f₁)² − r f₂² (i.e., irreducible) with 0 < f₂ <
q/2 then
        Possibly replace f₂ by q − f₂ , depending upon sign of b(x)
        output trit (f₁,f₂, 2)
    end if
```

Thus, in the above pseudo code several possible combinations for the factors of a(x) existed and were either arranged in a special order and/or flag bit(s) introduced to infer information about the "sign" of the factors in such a manner as to allow the proper determination of b(x) also. Here, a specially configured trit is output based on the factors being either a constant, a linear polynomial, a product of the same polynomial (e.g., a square of a polynomial), a product of distinct polynomials, or of an irreducible form.

The next example for the third scheme is for a hyperelliptic curve of genus four. Here, again, one goal is to compress (a(x), b(x)) with the factors of a(x) having been determined. With degree(a)=4, there are several different orders in which the factors of a(x) may appear. Hence, a multiple bit flag may be included in the compressed format to identify which combination applies to the factors.

Thus, for example, a(x) may factor into four linear factors, which may individually be determined to be either "positive" or "negative" factors, as there are four independent square roots to find. This leads to the following five possible grouped combinations (let $L_P$ be a positive linear factor, and $L_N$ be a negative linear factor): (1) $L_P, L_P, L_P, L_P$; (2) $L_P, L_P, L_P, L_N$; (3) $L_P, L_P, L_N, L_N$; (4) $L_P, L_N, L_N, L_N$; and (5) $L_N, L_N, L_N, L_N$.

In addition to linear factors, quadratic factors may also be produced. Thus, in the genus four example, there may be two linear factors and one quadratic factor, which lead to six additional combinations (let $Q_P$ be a positive quadratic factor, and $Q_N$ be a negative quadratic factor): (6) $Q_P, L_P, L_P$; (7) $Q_P, L_P, L_N$; (8) $Q_P, L_N, L_N$; (9) $L_P, L_P, Q_N$; (10) $L_P, L_N, Q_N$; and (11) $L_N, L_N, Q_N$.

In certain cases there may only be quadratic factors. Thus, in the genus four example, there may be two quadratic factors that lead to three additional combinations, namely: (12) $Q_P, Q_P$; (13) $Q_P, Q_N$; and (14) $Q_N, Q_N$.

In still other cases there may be linear and cubic factors. Therefore in the genus four example, there may be one linear factor and one cubic factor. This leads to four additional combinations (let $C_P$ be a positive cubic factor, and $C_N$ be a negative cubic factor): (15) $L_P, C_P$; (16) $L_P, C_N$; (17) $C_P, L_N$; and (18) $L_N, C_N$.

In other cases there may be other factors, such as, for example, an irreducible quartic factor. Indeed, the genus four example may include a quartic factor, which leads to two additional combinations (let $D_P$ be a positive quartic factor, and $D_N$ be a negative quartic factor): (19) $D_P$; and (20) $D_N$.

As such, there are twenty combinations for the factors in the genus four example as presented above. In accordance with certain implementations of the present invention, a five-bit flag can be employed to identify these twenty combinations (i.e., numbered 1 through 20).

In those cases where the degree(a)<4 can be encoded by introducing a dummy factor x+q in place of the gaps. Overall there are about $20(q+1)^4$ possible compressed images.

It should be understood that the methods and apparati provided herein may be adapted for use if degree(a)$\geq$2. Those skilled in the art will clearly be able to identify the possible combinations of different factors for a(x), determine positive/negative "signs" for the factors, assign flag bit(s) to identify the factors and/or their signs, and/or arrange the factors in some manner that also allows their respective signs to be determined.

To invert (i.e., decompress) the third scheme as exemplified above, point decompression module 162, for example, would receive an input (flag, $f_1$, $f_2$, $f_3$, $f_4$) with $1 \leq$ flag $\leq 20$ and $0 \leq f_i \leq q$ for all i: By way of further example, the subcase for $6 \leq$ flag $\leq 11$ (two linear factors, one quadratic factor) could resemble:

---

Set a(x) = (x + $f_1$)(x + $f_2$) ($x^2$ + $f_3$ x + $f_4$),
For the factor $a_1(x) = x^2 + f_3 x + f_4$
Set $sign_i$ = +1 if flag is even, $sign_i$ = −1 if flag is odd
Where $a_i(x)$ has a factor $a_i(x) = (x + f_j)^e$ with e > 0 do
 Set $sign_i$ = +1 if 2j $\leq$ flag − 5, $sign_i$ = +1 $sign_i$ = −1 if 2j > flag − 5
end where
For each i
 Find $b_i(x)$ such that $b_i(x)^2 \equiv f(x) \bmod a_i(x)$ .
 Where necessary, negate $b_i(x)$ so its sign is sign_i.
end for

---

Combine results by Chinese Remainder Theorem to obtain b(x).

In certain other implementations additional compression may be provided when two or more factors have the same degree. Thus, for four linear factors there are 4!=24 possible orderings of the coefficients. Sixteen of these twenty-four orderings may, for example, imply meanings such as "use positive square root for second smallest factor, negative square root elsewhere". These can be encoded using one value for flag rather than five such values. For the second case (two linear factors and one quadratic factor) there are $2^3$=8 combinations of signs, but half of these may be identified by ordering of the two linear factors, leaving only four values needed for flag. Thus, in this example, there would be only 1+4+2+4+2=13 cases rather than 20 as in the example above. This further reduction and others like it may be employed to further reduce the number of bits required in the resulting compressed format.

In still other implementations, if a(x) has a repeated factor, then the factor can be repeated twice, using the same sign for both corresponding square roots. Thereafter, Hensel lifting can be employed when decompressing. With these exemplary modifications, the image is bounded by $13(q+1)^4$. If one fully factors a(x) over the extension fields, then there will be about $q^d/d$ possible degree-d factors, not $q^d$. This reduces the number combinations to about $5q^4$ in the above example.

A conceptually simpler fourth scheme leaves a(x) unfactored (degree g) in the compressed format (image). Here, the compressed image can have a bit pattern identifying which factors of a(x) have negative b(x), after the factors are sorted into a canonical order, for example. However, this will require both the compression and the decompression modules to factor a(x).

Figure 4:
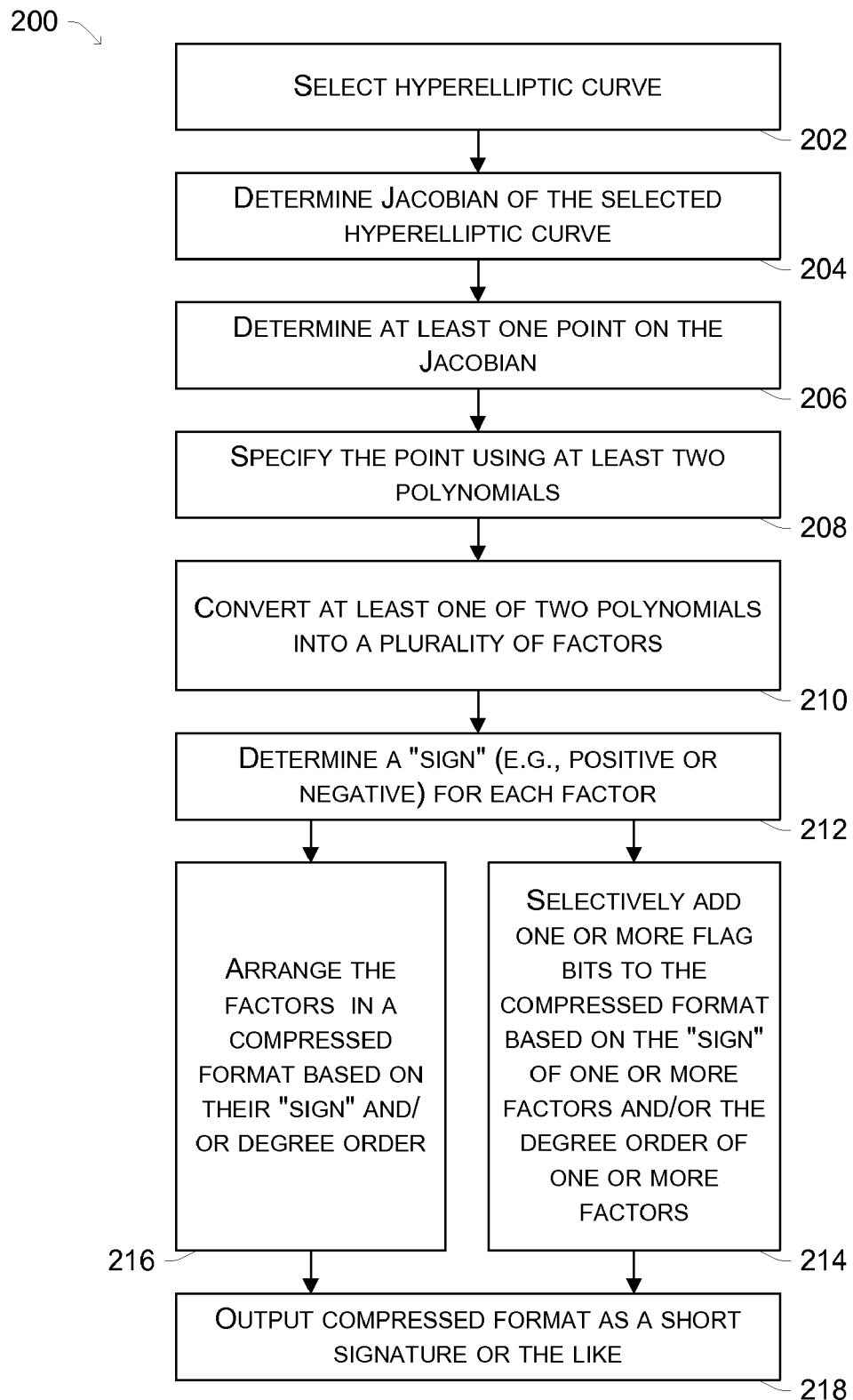
FIG. 4 is a flow diagram illustrating an exemplary process for generating a product ID in accordance with certain implementations of the present invention.

Attention is now drawn to FIG. 4, which is a flow diagram illustrating an exemplary process 200 for generating a product ID in accordance with certain implementations of the present invention. The process of FIG. 4 can be implemented by product ID generator 122 of FIG. 2, for example, and may be performed in logic (i.e., hardware, firmware, software, smartcard, and/or any combination thereof). The process includes point compression and implements a signature scheme, such as those described above, that produces a product ID short enough for practical use while still providing adequate security against attack. This signature scheme produces a signature based on a secret, with the secret being the order of a group of points on the Jacobian of a curve.

In act 202, a hyperelliptic curve is selected, for example, using known techniques. The Jacobian of the selected curve is determined in act 204, for example, using known techniques. A point on the Jacobian is determined in act 206, again for example, using known techniques.

In act 208, at least two polynomials are provided to specify the point as determined in act 206. Thus, for example, a(x) and b(x) can be determined in act 208. In act 210, at least one of the polynomials from act 208 are factored into at least one factor having at least one coefficient. A "sign" is determined for each factor in step 212. For example, each of the a(x) factors may be considered to be either "positive" or "negative" based on the root to use in determining b(x).

Acts 214 and 216 may be implemented individually or together. In certain implementations only act 216 is conducted, while in other implementations only act 214 is conducted. In still other implementations both acts 212 and 214 are conducted.

The factors are arranged in a compressed format based on their sign and/or degree order, in act 216. One or more flag bits are included in the compressed format along with the factors, based on the sign of the factors and/or degree order of the factors, in act 214. Some exemplary schemes are provided above that may be implemented in acts 214-216. In act 218, the resulting compressed format is output as a short signature or the like.

Figure 5:
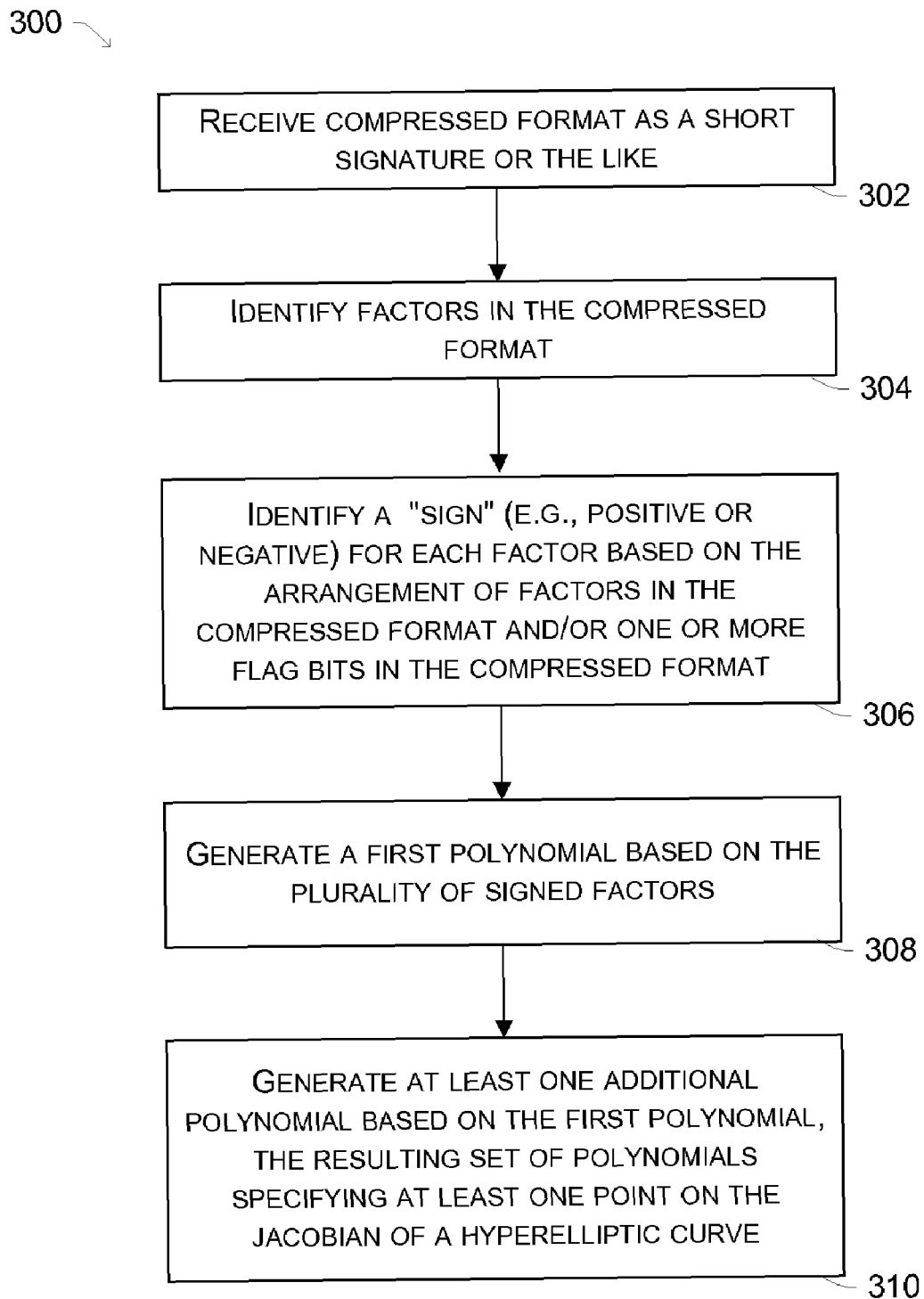
FIG. 5 is a flow diagram illustrating an exemplary process for processing a product ID in accordance with certain implementations of the present invention.

FIG. 5 is flow diagram depicting a process 300 for decompressing a compressed format, for example, as produced by process 200, in accordance with certain further implementations of the present invention.

Here, in act 302, the compressed format is received. The compressed format may include a short signature or the like, for example, as input by a user. Factors are then identified in the compressed format, in act 304.

A "sign" for each factor is then determined in act 306. For example, the sign may be "positive" or "negative" and determined by the arrangement of factors in the compressed format and/or flag bit(s) that are included in the compressed format.

Based on the information gathered from the compressed format, in act 308, a first polynomial can be recreated or otherwise generated. In act 310 at least one additional polynomial is recreated or otherwise generated using the first polynomial and the information gathered. The resulting polynomials, for example, specify a point on the Jacobian of a hyperelliptic curve.

Figure 6:
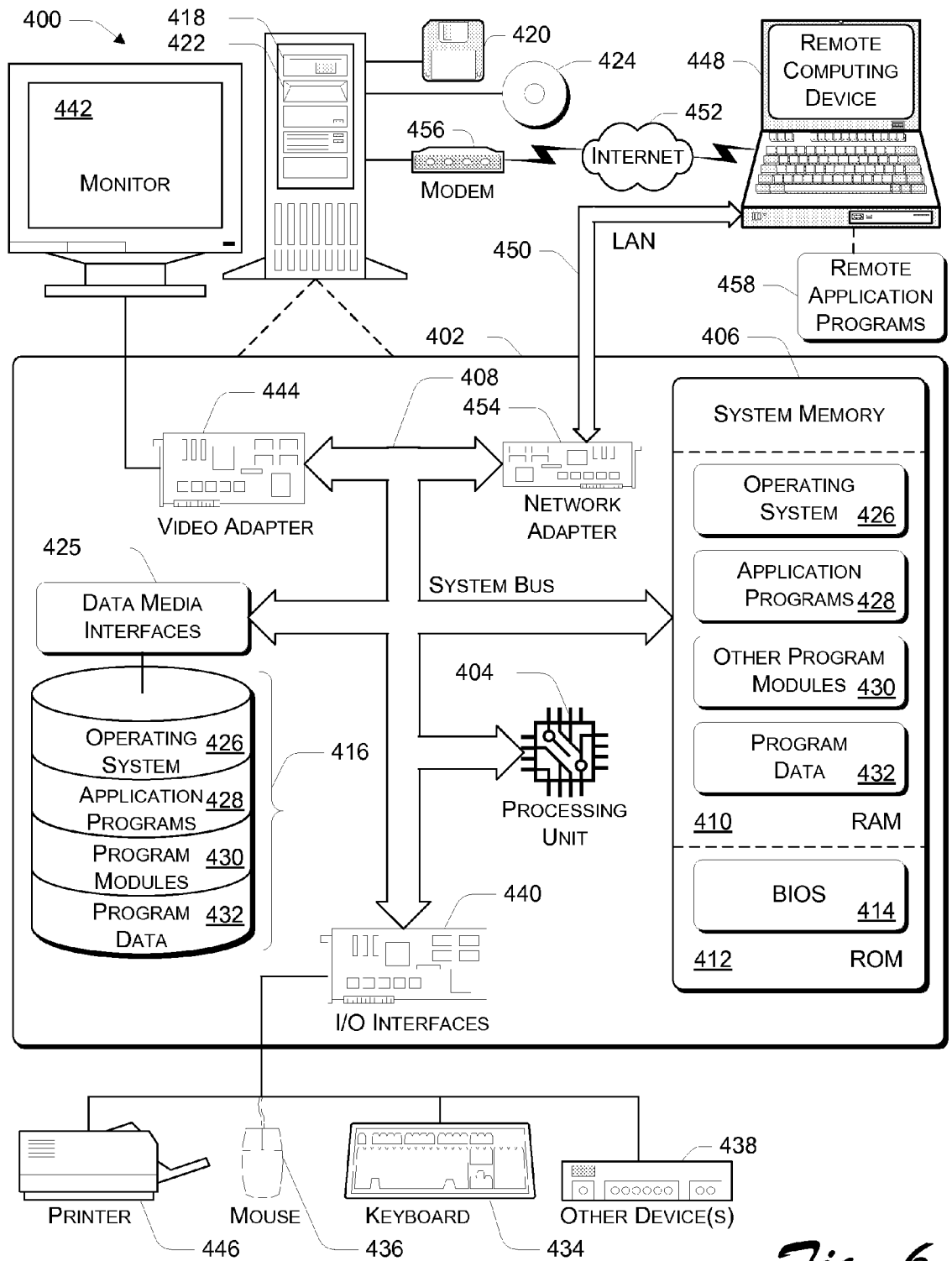
FIG. 6 illustrates a more general exemplary computer environment which can be used in various implementations of the invention.

FIG. 6 illustrates a more general exemplary computer environment 400, which can be used in various implementations of the invention. The computer environment 400 is only one example of a computing environment and is not intended to suggest any limitation as to the scope of use or functionality of the computer and network architectures. Neither should the computer environment 400 be interpreted as having any dependency or requirement relating to any one or combination of components illustrated in the exemplary computer environment 400.

Computer environment 400 includes a general-purpose computing device in the form of a computer 402. Computer 402 can implement, for example, encryptor 102 or decryptor 104 of FIG. 1, generator 120 or client computer 132 of FIG. 2, either or both of modules 152 and 153 of FIG. 3, and so forth. Computer 402 represents any of a wide variety of computing devices, such as a personal computer, server computer, handheld or laptop device, multiprocessor system, microprocessor-based system, programmable consumer electronics (e.g., digital video recorders), gaming console, cellular telephone, network PC, minicomputer, mainframe computer, distributed computing environment that include any of the above systems or devices, and the like.

The components of computer 402 can include, but are not limited to, one or more processors or processing units 404, a system memory 406, and a system bus 408 that couples various system components including the processor 404 to the system memory 406. The system bus 408 represents one or more of any of several types of bus structures, including a memory bus or memory controller, a peripheral 11 bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 402 typically includes a variety of computer readable media. Such media can be any available media that is accessible by computer 402 and includes both volatile and non-volatile media, removable and non-removable media.

The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 may also include other removable/non-removable, volatile/non-volatile computer storage media. By way of example, FIG. 6 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk 11 drive 422 are each connected to the system bus 408 by one or more data media interfaces 425. Alternatively, the hard disk drive 416, magnetic disk drive 418, and optical disk drive 422 can be connected to the system bus 408 by one or more interfaces (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may implement all or part of the resident components that support the distributed file system.

A user can enter commands and information into computer 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet.

When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components such as the operating system are illustrated herein as discrete blocks, although it is recognized that such programs and components reside at various times in different storage components of the computing device 402, and are executed by the data processor(s) of the computer.

Computer 402 typically includes at least some form of computer readable media. Computer readable media can be any available media that can be accessed by computer 402. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computer 402. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as wired network or direct-wired connection, and wireless media such as acoustic, RF, infrared and other wireless media. Combinations of any of the above should also be included within the scope of computer readable media.

The invention has been described herein in part in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various implementations.

For purposes of illustration, programs and other executable program components such as the operating system are illustrated herein as discrete blocks, although it is recognized that such programs and components reside at various times in different storage components of the computer, and are executed by the data processor(s) of the computer.

Alternatively, the invention may be implemented in hardware or a combination of hardware, software, smartcard, and/or firmware. For example, one or more application specific integrated circuits (ASICs) could be designed or programmed to carry out the invention.

Product identifiers generated using a curve-based cryptosystem are described herein. Although discussed primarily with reference to product identifiers for application programs, the product identifiers can be associated with any of a variety of goods, products, services, users, and so forth.

CONCLUSION

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

What is claimed is:

1. A method for compressing curve-based cryptography information using a computing device, the method comprising:
    establishing point information suitable for identifying at least one selected point on a Jacobian of a hyperelliptic curve using a plurality of polynomials;
    representing a portion of said point information in a compressed format such that said point information can subsequently be regenerated and said selected points determined based on said regenerated point information, wherein representing said portion of said point information in said compressed format further includes factoring at least one of said plurality of polynomials to produce at least one factor, said compressed format including said at least one factor; and
    creating a cryptographic key using the said point information the compressed format.

2. The method as recited in claim 1, wherein said plurality of polynomials includes a first polynomial a(x) and a second polynomial b(x) in $F_q$, wherein q is an odd prime power and $F_q$ denotes a finite field of q elements.

3. The method as recited in claim 2, wherein said hyperelliptic curve is given by an equation $y^2 = f(x)$ over $F_q$, where the degree of f(x) is selected from a set of degrees comprising 2g+1 and 2g+2, and f(x) has no repeated factors, and g is a positive integer.

4. The method as recited in claim 3, wherein g is equal to said genus of said hyperelliptic curve.

5. The method as recited in claim 2, wherein a degree of said second polynomial b(x) is less than a degree of said first polynomial a(x).

6. The method as recited in claim 2, wherein first polynomial a(x) divides $f(x) - b(x)^2$.

7. The method as recited in claim 1, wherein representing said portion of said point information in said compressed format further includes determining a sign for each said factor.

8. The method as recited in claim 7, wherein said determined sign for each said factor is associated with a corresponding root associated with at least one other one of said plurality of polynomials.

9. The method as recited in claim 7, further comprising:
generating said compressed format, said compressed format further including at least each said factor.

10. The method as recited in claim 9, wherein generating said compressed format further includes:
selectively arranging each said factor in a desired order within said compressed format.

11. The method as recited in claim 10, wherein selectively arranging each said factor in said desired order within said compressed format further includes:
selectively arranging each said factor based on a degree associated with each said factor, said degree being associated with a highest power exponent in each said factor.

12. The method as recited in claim 10, wherein selectively arranging each said factor in said desired order within said compressed format further includes:
selectively arranging each said factor based on said sign determined for each said factor.

13. The method as recited in claim 9, wherein generating said compressed format further includes:
adding flag information to said compressed image, said flag information being based on at least one said sign of at least one said factor.

14. The method as recited in claim 9, wherein generating said compressed format further includes:
adding flag information to said compressed format, said flag information being based on at least one degree associated with at least one said factor, said degree being associated with a highest power exponent in said at least one said factor.

15. The method as recited in claim 9, wherein generating said compressed format further includes:
adding flag information to said compressed image, said flag information including at least one bit of data.

16. The method as recited in claim 1, wherein said compressed format includes a short signature.

17. The method as recited in claim 1, wherein said compressed format includes a product identifier.

18. A method comprising:
receiving compressed format information;
identifying factors in said received compressed format information;
determining a sign for each of said factors;
generating a first polynomial based on said factors; and
generating a second polynomial based on said factors and said sign of each said factor, and wherein said first and second polynomials define at least one point on a Jacobian of a hyperelliptic curve of genus equal to g, where g is greater than one; and
verifying authentication of an entity based on the compressed format information, whereby the at least one point is used to facilitate the authentication.

19. A computer storage medium having computer-executable instructions for performing acts comprising:
accessing compressed format information;
determining factors in said received compressed format information;
identifying a sign for each of said factors;
generating a first polynomial based on said factors;
generating a second polynomial based on said factors and said sign of each said factor, and wherein said first and second polynomials define at least one point on a Jacobian of a hyperelliptic curve of genus equal to g, where g is greater than two; and
verify authentication of an entity based on the compressed format information, whereby the at least one point is used to facilitate the authentication.

* * * * *